United States Patent [19]

Temple

[11] Patent Number: 4,615,946

[45] Date of Patent: Oct. 7, 1986

[54] CHEMICALLY TREATED GLASS FIBERS FOR REINFORCING POLYMERIC MATRICES

[75] Inventor: Chester S. Temple, Pittsburgh, Pa.

[73] Assignee: PPG Industries, Inc., Pittsburgh, Pa.

[21] Appl. No.: 717,760

[22] Filed: Mar. 29, 1985

[51] Int. Cl.$^4$ .............................................. D02G 3/00
[52] U.S. Cl. .................................... 428/361; 65/3.41; 65/3.43; 65/3.44; 428/378; 428/391; 428/392
[58] Field of Search ............... 428/375, 378, 391, 392, 428/361; 65/3.41, 3.43, 3.44

[56] References Cited

U.S. PATENT DOCUMENTS

| | | |
|---|---|---|
| 3,044,898 | 7/1962 | Habib . |
| 3,459,585 | 8/1969 | Killmeyer et al. ................... 428/378 |
| 3,475,149 | 10/1969 | Eckerle et al. ................... 65/3.44 X |
| 3,803,069 | 4/1974 | McWilliams et al. . |
| 3,814,592 | 6/1974 | McWilliams et al. . |
| 4,029,623 | 6/1977 | Maaghul . |
| 4,039,716 | 8/1977 | Johnson ............................. 428/391 |
| 4,148,772 | 4/1979 | Marchetti et al. . |
| 4,271,229 | 6/1981 | Temple . |
| 4,283,322 | 8/1981 | Temple ............................. 428/392 |
| 4,301,052 | 11/1981 | Pollman .......................... 65/3.41 X |
| 4,341,877 | 7/1982 | Das et al. . |
| 4,358,502 | 11/1982 | Dunbar . |
| 4,374,177 | 2/1983 | Hsu et al. . |
| 4,382,991 | 5/1983 | Pollman .......................... 65/3.44 X |
| 4,413,085 | 11/1983 | Temple ............................. 428/378 |
| 4,432,850 | 2/1984 | Moriarity et al. . |
| 4,455,343 | 6/1984 | Temple . |
| 4,457,970 | 7/1984 | Das et al. ........................ 428/391 X |

FOREIGN PATENT DOCUMENTS 1096524 2/1981 Canada .
30194 4/1975 Japan .

Primary Examiner—George F. Lesmes
Attorney, Agent, or Firm—Kenneth J. Stachel

[57] ABSTRACT

Chemically treated glass fibers in the form of continuous bundles of glass fibers and chopped bundles of glass fibers are provided that have good handleability and thermal aging characteristics in reinforcing thermoplastic polymers. The chemically treated glass fibers have a dried residue of an aqueous chemical treating composition. The aqueous chemical treating composition has two aqueous soluble, dispersible, or emulsifiable film forming polymers which can be either epoxy polymers and polyurethane polymers or epoxy polyurethane copolymers and polyurethane polymers and an amino alkyl functional silane coupling agent and at least a second silane coupling agent which can be a lubricant modified amine organo functional silane coupling agent, a polyamino organo functional silane coupling agent, an epoxy organo functional silane coupling agent or a vinyl organo functional silane coupling agent and a reaction product process aid. The reaction product process aid is obtained by reacting alkoxylated nitrogen-containing compound such as an alkoxylated fatty amine and an alkoxylated fatty amide with a polycarboxylic acid to produce a product which is reacted with an epoxide compound. The amount of water in the aqueous chemical treating composition is that to give an effective solids content for treating the glass fibers. The chemically treated glass fibers as chopped bundles of glass fibers are suitable for reinforcing such thermoplastic polymers as polybutylene terephthalate, polyphenylene sulfide, polyphenylene oxide and polyacetals.

21 Claims, No Drawings

CHEMICALLY TREATED GLASS FIBERS FOR REINFORCING POLYMERIC MATRICES

The present invention relates to chemically treated glass fibers for reinforcing polymers to produce fiber reinforced polymers. More particularly, the treated glass fibers in the form of chopped bundles of glass fibers provide good reinforcement for thermoplastic polymer matrices like polybutylene terephthalate, polyphenylene oxide, polyphenylene sulfide and polyacetals.

Glass fibers have proved useful in reinforcing thermosetting polymers and thermoplastic polymers. Thermoplastic polymer reinforcement with glass fibers provides a challenge, since there is an absence or a reduced occurrence of any crosslinking reactions between the matrix polymer and the surface chemical treatment on the glass fibers. Chopped strands of glass fibers used to reinforce thermoplastic polymers in various molding operations should have various characteristics to be successful. For the facile production of the chopped glass fiber strands or bundles, the glass fibers should have good choppability whether in a wet or dry chop operation. For molding the thermoplastic polymer with chopped strand, the chopped strand should have good resistance to filamentation and good handleability. Also, the glass fiber reinforced thermoplastic article should have good thermal aging properties, where the chemical treatment on the glass fibers does not detrimentally affect the matrix polymer to reduce the thermal aging properties.

It is an object of the present invention to provide chemically treated glass fibers which have good integrity, good flow and a good bulk density for reinforcing thermoplastic polymers.

It is a further object of the present invention to provide chopped bundles of the chemically treated glass fibers for reinforcing thermoplastic polymers to provide reinforced thermoplastic articles having good thermal aging properties.

SUMMARY OF THE INVENTION

The aforementioned objects and other objects deduced from the following disclosure are accomplished by the chemically treated glass fibers of the present invention. The glass fibers have a dried residue of an aqueous chemical treating composition. The aqueous chemical treating composition has two film forming polymers, which can be an epoxy polymer and polyurethane polymer or an epoxy polyurethane copolymer and a polyurethane polymer, an amino alkyl silane coupling agent, a second organo silane coupling agent which is a lubricant modified amino functional organo silane coupling agent and/or a polyamino functional organo silane coupling agent or an epoxy functional organo silane coupling agent or a vinyl functional organo silane coupling agent, and a process aid and water. The process aid acts as a binder stabilizer and is a reaction product obtained by reacting alkoxylated nitrogen-containing compound like an alkoxylated fatty amine or an alkoxylated fatty amide with a polycarboxylic acid and reacting the resulting product with an epoxide compound. The film forming polymers are dispersible, soluble or emulsifiable in the aqueous medium as is the reaction product processing aid. The amount of water in the aqueous chemical treating composition is that amount which gives an effective solids content so that the aqueous chemical treating composition can be applied to glass fibers.

Any known glass fibers can be treated with the aqueous chemical treating composition by any conventional method for producing chopped or continuous glass fibers. The aqueous chemical treating composition can be applied to the glass fibers in a wet chop operation, where the fibers are gathered into bundles of fibers and chopped directly in the forming process or the chemically treated glass fibers can be gathered into bundles or strands of glass fibers and wound into a forming package on a winder and subsequently chopped. The chopped bundles of the chemically treated glass fibers are dried if they were not dried before chopping and can be used to reinforce thermoplastic polymers such as polybutylene terephthalate, polypropylene oxide, polyphenylene sulfide and polyacetals in conventional molding operations.

DETAILED DESCRIPTION OF THE INVENTION

The two film forming polymers present in the aqueous chemical treating composition provide for an epoxy and polyurethane or isocyanate functionality. The two film forming polymers which are soluble, dispersible or emulsifiable in aqueous medium can be a combination of one epoxy polymer and one polyurethane polymer or a combination of an epoxy polyurethane copolymer and a polyurethane polymer. The ratio of epoxy functionality to isocyanate or polyurethane repeating unit functionality is in the range of 99:1 to 1:99. These film forming materials provide a cure and/or evaporative film on the glass fibers and/or strands to assist in holding the filaments together in a bundle of filaments commonly called a strand. In addition, the film forming polymers have the functional groups that assist in bonding the filaments to the organo functional end of the silane coupling agent or to the thermoplastic polymer. The latter would be through hydrogen bonding or Van der Walls forces.

A suitable epoxy compound for use in the aqueous sizing of the present invention is one that contains more than one group which has an oxygen atom attached to adjacent carbon atoms, known as an oxirane ring and depicted by the formula

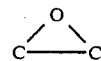

It is well known that epoxy resins may be prepared as a reaction product of a halohydrin and a phenol. One group of polyepoxy compounds which may be used is obtained by the reaction of a stochiometric excess of an epihalohydrin, such as an epichlorohydrin, with a polyhydric phenol such as bis-(4-hydroxy phenyl)-2,2-propane, bis(hydroxy phenyl)methane (obtained by the acid condensation of two moles of phenol with one mold of formaldehyde), hydroquinone, resorcinol, etc., or with a polyhydroxy alcohol such as glycol, polyethylene glycol, sorbitol, glycerol, etc. The expoxy resin has an epoxy equivalent weight of about 170 to about 900. By varying the proportions of the epihalohydrin and the phenolic polyhydroxic compounds and/or by varying the reaction conditions, compounds of varying epoxide equivalents within this range can be produced which range from liquid to solid, but are preferably liquid. Typically, the molecular weight range can be between about 300 to about 900, and more preferably between about 300 and 600. The epoxy resin or resins can be used in an amount of about 0.1 to about 10 weight percent of the aqueous sizing composition and preferably about 0.2 to about 3.5 percent by weight based on the total weight of the aqueous sizing composition. A particularly suitable epoxy resin for use in the sizing composition of the present invention is designated "Epi-rez CMD 35201" commercially available from Celanese Polymer Specialties Co. This epoxy resin is an epoxy resin dispersion which has 60% nonvolatiles with the only volatile being water and a weight per epoxide of approximately 530, a pH of 8.3 and an average particle size between 1 and 4 microns. This epoxy resin may be cured using any conventional epoxy curing agents with allowance being made for the water environment. Another suitable epoxy resin that can be used is designated "Genapoxy 370-H55" which is commercially available from General Mills Chemical Division. Another example of a suitable epoxy polymer is the epoxy novolak materials; and nonexclusive examples of these include Celanese 5003 material from Celanese Chemical Company and the Polymene 510 material available from Quaker Chemical Company.

The polyurethane polymer can be any aqueous dispersible, emulsifiable or solubilizable polymer reaction product of a polyol, including glycols, and polyisocyanates including diisocyanates with limited formation of allophanate and biuret groups. Nonexclusive examples of suitable polyisocyanates, which are employed to produce the polyurethane polymer used with the aqueous sizing composition of the present invention include those having an average NCO functionality of at least about 2, such as, for example, polymethylene polyphenyl isocyanates, suitable organic diisocyanates, for example, 2,3-toluene-diisocyanate, 2,6-toluene-diisocyanate, hexamethylenediisocyanate, p,p'-diphenylemthanediisocyanate, p-phenylenediisocyanate, hydrogenated methylene diphenyldiisocyanate, polyisocyanate naphthalene diisocyanate, dianisidine diisocyanate, mixtures of one or more polyisocyanates and the like. Also NCO-containing prepolymers can be used and these include the reaction products of an excess of an organic diisocyanate with polyhydroxyl-containing compounds having from 2 to about 8 OH groups per molecule such as, for example, ethylene glycol, glycerine, trimethylolpropane, pentaerylthritol, sorbitol, sucrose, mixtures thereof and/or with dihydroxyl-containing compound such that the average hydroxyl functionality in the mixture is at least about 2.0. It is preferred that these polyurethanes are liquid, however, in the event that they are solids are semisolids or of a relatively high viscosity such that blending with the other components would be difficult or inconvenient, they may be prepared in a suitable solvent or by melting and then emulsified into an oil-in-water emulsion with suitable surfactants. Nonexclusive examples of suitable polyol or dihydroxyl-containing compounds which may be used in forming the polyurethane include, ethylene glycol, propylene glycol, butylene glycol, pentanediol, hexanediol, diethyleneglycol, diproylene glycol, bisphenol A, resorcinol, catechol, hydroquinone, mixtures thereof, adducts of a dihydroxyl-containing compound and a viscinal epoxy compound such as, for example, ethyleneoxide, 1,2-propylene oxide, 1,2-butyleneoxide, epichlorohydrin, epibromohydrin, mixtures thereof and the like. When the dihydroxyl-containing compound is a solid, it is suitably employed by either dissolving it in a suitable solvent or melting it and then converting it into an oil-in-water emulsion by use of suitable surfactants and water.

Of this class of polyurethanes, curable, blocked, polyurethane polymers can be used which are aromatic, aliphatic or alicyclic in nature. The emulsions or dispersions are formed by dissolving the polyurethane prepolymer in a nonreactive organic solvent for the polyurethane in a sufficient amount, for example 20–50 percent by weight based upon the weight of the solution, adding sufficient surfactants with the proper HLB range and then gradually mixing the solution with sufficient water to form a stable emulsion of droplets of the solution in the water. These blocked polyurethane resins are formed by the reaction of a polyisocyanate, such as toluene diisocyanate adducts of hydroxyl terminated polyether or polyester resins with an end blocking compound containing active hydrogen atoms such as an amide or polyamide according to conventional techniques for the production of polyurethane resins. The polyisocyanate can be referred to as a prepolymer i.e., an adduct of a simple diisocyanate with a suitable polyfunctional resin. Particularly suitable polyurethane polymers are those that are substantially aliphatic or alicyclic in nature where the majority of the polyurethane polymeric chain is constituted of aliphatic or hydrogenated aromatic, or alicyclic moieties. Particularly suitable aqueous emulsions of polyurethane polymers are designated "Rucothane ®" latices designated as 2010L, 2020L, 2030L, 2040L, 2050L, and 2060L. These materials are available from the Ruco Chemical Corporation, New York. These materials include thermoplastic urethane latice having varied particle sizes and characterized as high molecular weight aliphatic isocyanate based thermoplastic elastomers in aqueous dispersions using anionic or nonionic surfactants. The most preferred polyurethane used is one that is a carboxylated polyurethane to assist in water dispersibility. The Rucothane latices are based on aliphatic components and have a polymer solids content in stable emulsions ranging from 55–60% by weight. The Rucothane latices have a Brookfield viscosity RVF4 in centipoise at 2 RPM ranging from 7,000 for about 2060L and 2030L latices up to 25,000 for the 2020L latex.

An additional example of a polyurethane resin that can be used are the polyurethane resins available from Witco Chemical Company under the trade designation Witcobond, like the material Witcobond W290H. This material has a solids content of between 61 and 63 percent, a viscosity, Brookfield (Spindle 3, 60 RPM, LVF) between 200 centipoise and 600 centipoise, a pH between 7 and 9 and a particle size of 5 microns. The particle change for the W290H is anionic. Also, the Mobay XW urethane latices can be used and these are available from Mobay Chemical Corporation, the Organics Division under the trade designations XW-110, XW-111 and XW-114 materials.

The amount of the polyurethane polymer used in the aqueous sizing composition is in the range of about 0.1 to about 10 weight percent of the aqueous sizing composition; preferably 1 to 3 weight percent or about 20 to about 60 weight percent of the solids of the aqueous sizing composition.

In addition to the epoxy polymer and polyurethane polymer or just with the polyurethane polymer, a copolymer of an epoxy polymer and polyurethane polymer can be used. These materials can be formed by use of polyepoxide prepolymer having one or more oxirane rings and also having open oxirane rings, which are used as hydroxyl groups for the dihydroxyl-containing compounds for reaction with diisocyanates or polyisocyanates. The isocyanate moiety opens the oxirane ring and the reaction continues as an isocyanate reaction with a primary or secondary hydroxyl group. There should be sufficient epoxide functionality on the polyepoxide resin to enable the production of an epoxy polyurethane copolymer still having effective oxirane rings. Linear polymers are produced through reactions of diepoxides and diisocyanates. The di- or polyisocyanates can be aromatic or aliphatic although the aliphatic di- or polyisocyanates are preferred for better thermal stability and non-yellowing of the chemically treated glass fibers. The aqueous dispersion or emulsion of an epoxy polyurethane copolymer can be prepared by reacting the copolymer with a primary or secondary amine to form an epoxide-amine adduct. With the secondary amine, the reaction occurs through the amine opening the epoxide ring forming a tertiary amine and a secondary hydroxyl group. The epoxide amine adduct is solublized and obtains a cationic character by further reaction with an acid to form a tertiary amine acid salt. Optionally a solvent such as a water-miscible solvent, nonexclusive examples of which are esters, ethers or ketones can be employed. A suitable class of polyepoxide resins having isocyanate or polyisocyanate functionality is a polymeric material containing two or more epoxy groups per molecule. The polyepoxides are of a relatively high molecular weight of at least 350, and preferably within the range of 350 to 2,000. These polyepoxides are combined with the blocked, crosslinkable isocyanate derivatives. The blocked isocyanate derivatives act as crosslinking or curing agents for the polyepoxide to produce epoxy polyurethane copolymers. Types of polyepoxide polymers which can form the epoxide amine adducts are given in U.S. Pat. No. 4,148,772 (Marchetti et al.), where the portions of this patent relating to the description of the polyepoxide polymers and the epoxide-amine adducts are incorporated herein by reference. Also the polyepoxide amine adducts which are chain extended with organic polyols with or without the use of a catalyst can be employed as taught in U.S. Pat. No. 4,148,772, those portions of this patent also hereby incorporated by reference.

A suitable epoxy polyurethane copolymer for the present invention is that available from Celanese Chemical Company Specialty Resins, under the trade designation CMDW 60-5520 epoxy resin dispersion. This material is an aqueous dispersion of a urethane modified epoxy resin with an epoxy equivalent weight of 540 having a solids content of 60 percent. There are no organic solvents present and the dispersion is thixotropic. The epoxy polyurethane polymer can be cured through both epoxy functionality and hydroxyl functionality. Curing agents most conveniently employed are those which are water soluble or dispersible and which are stable in aqueous medium. For instance, dicyandiamide, substituted amidizoles, aliphatic and aromatic amines, melamine resins and urea formaldehyde resins. Although it is preferred that curing agents are not used in the aqueous chemical treating composition for the film forming polymers. The amount of the epoxy polyurethane copolymer in the aqueous treating composition can be in the range of about 0.1 to about 10 weight percent and preferably about 3 to about 7 weight percent of the aqueous treating composition.

The amounts of the film forming polymers in the aqueous chemical treating composition can vary somewhat depending upon the polymeric matrix to be reinforced. When the polymeric matrix is an epoxy, higher amounts of the epoxy polymer or more epoxy functionality in the epoxy polyurethane polymer can be present in the aqueous chemical treating composition. When the epxoy polyurethane copolymer is used with the polyurethane polymer, it is preferred that the epoxy polyurethane copolymer is present in a predominant amount of the solids of the film forming materials present in the aqueous chemical treating composition. The amount of the film forming materials present in the aqueous chemical treating composition can range in an amount between about 1 and about 20 weight percent of the aqueous chemical treating composition.

The aqueous chemical treating composition also has present at least two organo functional silane coupling agents. One of the organo functional silane coupling agents is always an amino alkyl functional silane coupling agent like gamma aminopropyltriethoxy silane. This material is available from Union Carbide Corporation under the trade designation A-1100. The second organo silane coupling agent present in the aqueous chemical treating composition can be a lubricant modified, amine functional organo silane coupling agent, a polyamino functional organo silane coupling agent, mixtures of these and an epoxy functional organo silane coupling agent and a vinyl functional organo silane coupling agent. The lubricant modified amine functional organo silane coupling agent is available from Union Carbide under the trade designation A-1108 coupling agent. The polyamino functional organo silane coupling agent is available from Union Carbide under the trade designation A-1120. It is preferred to have an amount of the total organo functional silane coupling agents present in the aqueous chemical treating composition in an amount of about 0.01 to about 2 weight percent of the aqueous chemical treating composition. Preferably, the organo functional silane coupling agents are a combination of the amino alkyl functional silane coupling agent, the lubricant modified amino functional silane coupling agent and the polyamino functional organo silane coupling agent. Most preferably, the combination is a 1:1:1 mixture, although the solids content of the lubrication modified amino silane coupling agent will make this material the predominant amount of the solids of the three silane coupling agents present in the aqueous chemical treating composition.

The aqueous chemical treating composition also has a reaction product process aid which is believed to function as a stabilizer for the treating composition and as a process aid in reducing stickiness of the dried treated glass fibers. The reaction product process aid is obtained by reacting an alkoxylated nitrogen containing compound such as an alkoxylated fatty amine or amide with a polycarboxlic acid and then reacting the resulting product with an epoxide compound. This compound and the method of producing it are taught in U.S. Pat. No. 3,459,585, which is hereby incorporated by reference. The reaction product is preferably produced by reacting one mole of the alkoxylated nitrogen containing compound with two moles of the polycarboxylic acid. The resulting reaction product is then reacted with two moles of an epoxide compound, preferably a polyepoxide compound. The reaction product process aid is present in the aqueous chemical treating composition in an amount of about 0.01 to about 0.1 weight percent of the aqueous chemical treating composition or in an amount of about 0.1 to about 1 weight percent of the solids of the aqueous chemical treating composition. This amount is effective to serve as a lubricant and processability agent as well as to impart the stabilizing function.

The aqueous chemical treating composition has a sufficient amount of water to give a total solids (nonaqueous content) of the aqueous chemical treating composition in the range of about 1 to about 25 weight percent, preferably 3 to about 11 weight percent and most preferably about 4 to about 7 weight percent. In all events, the amounts of the various components should not exceed that amount which will cause the viscosity of the solution to be greater than 100 centipoise at 20° C. Solutions having viscosities greater than 100 centipoise are difficult to apply to glass fibers during their formation with standard type applicator equipment without breaking the continuity of the fibers. It is preferred that the viscosity of the aqueous chemical treating composition be between about 1 and 20 centipoise at 20° C. for best results.

The aqueous chemical treating composition is essentially free of film formers like polyvinyl acetate homoplymer and polyester homopolymers. The presence of these materials would tend to degrade the thermal aging properties of the glass fiber reinforced polymer.

The aqueous chemical treating composition can be prepared by adding any of the components simultaneously or sequentially to each other to form the aqueous chemical treating composition. It is preferred to predilute all of the components before they are added together and combined with water. For example, the silane coupling agents are added to water and hydrolyzed and the film forming polymers are individually diluted and added to the mix and the reaction product processing aid is added to the mixture and the entire mixture is diluted with water to the desired volume.

Glass fibers treated with the aqueous chemical treating composition can be any known glass fibers such as "E-glass", "621-glass", and low boron or low fluorine derivatives thereof and the like. The aqueous chemical treating composition is applied to the glass fibers preferably in the forming operation in a wet chop operation. Although the aqueous chemical treating composition can be applied to the glass fibers in a continuous strand winding operation in forming or can be applied to the glass fibers after forming. The amount of the aqueous chemical treating composition on the glass fibers can range in an amount of about 0.1 to about 1.5 percent LOI, preferably 0.45 to about 0.75 LOI. The glass fiber strands can be chopped into any choppable length such as less than 1/16 of an inch to greater than 2 inches but preferably is in the range of about ⅛ of an inch to around 3/16 of an inch. The chopped glass fiber strands are dried to remove residual moisture and to adequately cure the chemically treated glass fibers. Under curing can result in poorer integrity of the strand.

The dried chopped glass fiber strands can be used to reinforce thermoplastic polymers such as polybutylene terephthalate, polyphenylene oxide, polyphenylene sulfide, and polyacetals by any conventional injection molding operation. The chopped glass fiber strands can be made into pellets with the matrix polymer and injected molded. Also, the strands of the treated glass fibers can be used as continuous strands and roving and in producing chopped, continuous or needled mats.

PREFERRED EMBODIMENT OF THE INVENTION

The glass fibers to be treated with the aqueous chemical treating composition are preferably "E-glass" or "621-glass" fibers. The glass fibers can be formed into any conventional filament diameters but are preferably of a diameter in the range of about 11 to about 16 microns. The aqueous chemical treating composition for treating the glass fibers preferably has the two film forming polymers comprising an aqueous emulsifiable epoxy polyurethane copolymer and an aqueous emulsifiable polyurethane polymer in a ratio of around 2:1 to around 3:1. Also the amine alkyl organo functional silane is a gamma aminopropyltriethoxy silane. This silane is present along with a lubricant modified amine functional organo functional silane coupling agent and a polyamino organo functional silane coupling agent. The silanes are present in approximately equal ratios to each other, but the lubricant modified amine functional silane may be present in a greater amount because of a higher solids content. The reaction product processing aid is preferably prepared from alkoxylated nitrogen containing compounds selected from the group consisting of

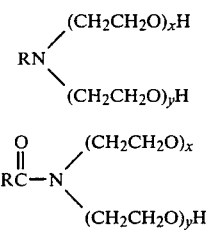

where R is a fatty alkyl group containing from 12 to 18 carbon atoms and x and y are 1 to 100. One mole of the alkoxylated nitrogen containing compound is reacted with two moles of a polycarboxylic acid to obtain a reaction product having a molecular weight of approximately 300 to 11,000 and an acid number of 20 to 300 and the unesterified carboxyl groups of the intermediate product are esterified with two moles of polyepoxide compound such as Epon 826 available from Shell Chemical Company. The preferred aqueous chemical treating composition has a solids content of around 5 to 6 and most preferably 5.3 to 5.7 and a pH of around 9.5 to 10.5.

The most preferred aqueous chemical treating composition for treating glass fibers is shown in Table 1.

TABLE 1

| Materials | Gms As Is for 5 Gal. | % As Is | Gms Solids | % Solids of Total Solids | % Solids of Binder |
|---|---|---|---|---|---|
| Gamma aminopropyl-triethoxy silane (A-1100) | 125 | 0.661 | 75.863 | 6.89 | 0.38 |
| Lubricant modified amino-functional organo silane (A-1108) | 125 | 0.661 | 111.575 | 10.13 | 0.56 |
| Polyamino functional organo silane (A1120) | 125 | 0.661 | 99.675 | 9.05 | 0.50 |
| Aqueous emulsion of epoxy polyurethane co-polymer (CMD W60-5520) | 962 | 5.083 | 577.200 | 52.39 | 2.88 |
| Aqueous emulsion of polyurethane polymer (Witco W190H) | 350 | 1.849 | 227.500 | 20.64 | 1.13 |
| Reaction product process aid | 50 | 0.264 | 10.000 | 0.90 | 0.05 |

TABLE 1-continued

| Water (Deionized) | |
| --- | --- |
| H₂O for silanes | 6000 |
| H₂O for epoxy polyurethane emulsions | 1000 |
| H₂O for polyurethane emulsion | 1000 |
| H₂O for reaction product process aid | 500 |

The method of preparing the aqueous chemical treating composition involves placing deionized water for the silanes into a main vessel and adding the gamma aminopropyltriethoxy silane and the lubricant modified amino functional organo silane coupling agent and adding the polyamino organo functional silane coupling agent with a five minute stirring interval between each addition. The aqueous emulsion of the epoxy polyurethane copolymer having a solids content of around 60 percent is diluted with water in about a 1:1 ratio and added to the main mix tank. The aqueous dispersion of the polyurethane polymer is diluted with water from its solids content of 65 weight percent in a ratio of less than 1:1 of the emulsion to water. This dilution is then added to the main mix tank. The reaction product processing aid is diluted with water in a ratio of 1:10 process aid to water and added to the main mix tank. The total mixture is then diluted with water to the desired volume. The viscosity of the aqueous chemical treating composition is preferably around 1.25 to 1.55 centipoise at 72° F. (22° C.).

Preferably, the aqueous chemical treating composition is applied to the glass fibers in a wet chop operation and the glass fibers can be chopped into lengths in the range of about ⅛ of an inch to ¼ of an inch. The percent LOI on the bundles of the treated glass fibers is in the range of about 0.045 to 0.75. Preferably, the moisture is around 9 to 14 percent for the K diameter filaments. The chopped glass fiber strands are dried so that the dry chop glass fiber strands have a bulk density in the range of about 38 to 44 pounds per cubic feet, a funnel flow of 2 to 5 seconds per 1,000 grams.

Preferably, the chopped glass fiber strands are used to reinforce the thermoplastic polymer polybutylene terephthalate in injection molding operations.

EXAMPLES

Four aqueous chemical treating compositions were prepared in a manner similar to that of the preferred embodiment and the components and their amounts are listed in Table 2.

TABLE 2

AQUEOUS CHEMICAL TREATING COMPOSITIONS

| Materials | Example 1 (gms) | Example 2 (gms) | Example 3 (gms) | Example 4 (gms) |
| --- | --- | --- | --- | --- |
| Gamma aminopropyltriethoxy silane (A-1100) | 125 | 125 | 125 | 125 |
| Lubricant modified amine-organo functional silane (A-1108) | 125 | 125 | 125 | 125 |
| Polyamine organo functional silane (A-1120) | 125 | 125 | 125 | 125 |
| Water | 6000 | 6000 | 6000 | 6000 |
| Reaction product process aid | 50 | 50 | 50 | 50 |
| Water | 1000 | 500 | 500 | 500 |
| Aqueous emulsion of epoxy polyurethane copolymer | 962 | 962 | 962 | 962 |
| CMD-W-60-5520 | | | | |
| Water | — | 1000 | 1000 | 1000 |
| Aqueous emulsion of polyurethane | | | | |
| Witco W290H | 350 | 350 | — | 350 |
| Ruco 2011L | — | — | 370 | — |
| Water | 1000 | 100 | 1000 | 1000 |
| pH | 10.1 | 10.0 | 9.7 | 10.5 |
| Solids % | 5.6 | 5.5 | 5.6 | 5.8 |

The aqueous chemical treating compositions of Table 2 were used to treat glass fibers prepared into strand constructions of K 6.6. Chopped strand LOIs (lose on ignition) and handling properties are given in Table 3.

TABLE 3

Chopped Bundles of Treated Glass Fibers

| | Example 1 | Example 2 | Example 3 | Example 4 |
| --- | --- | --- | --- | --- |
| Chopped Length (inch) | 3/16" | ⅛" | ⅛" | ⅛" |
| % LOI | 0.46–0.49 | 0.64 | 0.63 | 0.70 |
| Bulk density, lb/ft³ | 40.9 | 41.4 | 40.5 | 41.9 |
| Funnel flow secs/1000 gm | 2.5 | 2.0 | 2.0 | 2.0 |

In the preferred embodiment and in the following examples, the bulk density test measures a slip flow characteristic in relation to compaction of chopped glass fiber strands. Compaction comes into play in molding reinforced thermoplastic materials. Bulk density is measured by filling a test tube with a known volume of chopped glass fiber strands. The test tube is placed on a shaker and the volume occupied by the strands after shaking is recorded. Higher volumes indicate better bulk density.

The funnel flow tests were conducted by placing a given quantity of chopped glass fiber strands either dry chopped or dried wet chopped in a funnel equipped for vibration. The time it took the total weight of chopped glass fiber strands to pass through the funnel was recorded. The lower time on this test indicates better flow is the better result.

The chopped glass fiber strands having the dried residue of the aqueous chemical treating composition of Example 4 were used in molding of fiber reinforced thermoplastic polymers. Also used were commercially availale chopped glass fiber strands for purposes of comparison.

Table 4 compares the thermal aging properties of ⅛ inch chopped glass fiber strands of Example 4 as compared against the ⅛ inch commercial standard A, 3/16 inch commercial standard B, and ¼ inch commercial standard C. All test data were gathered with spcimens that were direct dry blend molded on the same day using the same molding parameters at a 30 percent chopped strand level with a polybutylene terephthalate resin available from Celanese Chemical Company under the trade designation Celanex ® 2002-2PBT resin.

Table 4 shows the equivalent or superior performance of the Example 4 chopped glass fiber strand to the competitive chopped strands.

TABLE 4

DIRECT CHOP FOR PBT THERMALLY AGED TENSILES, @ 190° C.

| Chopped Strand | WEEKS EXPOSURE A NOTED TIMES @ 190° C. | | | | | | | |
|---|---|---|---|---|---|---|---|---|
| | 0 | 1 | 2 | 4 | 6 | 8 | 10 | 12 |
| Example 4 3/16" | 20,900 | 22,400 | 17,500 | 14,400 | 11,300 | 9800 | 9000 | 8500 |
| Commercial B ⅛" | 20,600 | 22,100 | 17,600 | 14,900 | 11,800 | 10,800 | 8800 | 8200 |
| Commercial A ⅛" | 19,800 | 20,800 | 16,900 | 14,300 | 11,400 | 9500 | 8500 | 7900 |
| Commercial C | 20,800 | 22,100 | 17,500 | 14,500 | 11,600 | 9800 | 9200 | 8400 |

Table 5 shows the good handling properties of the chopped glass fiber strand of Example 4.

TABLE 5

DIRECT CHOP FOR PBT HANDLING PROPERTIES

| CHOPPED STRAND | % LOI | BULK DENSITY PCF 1 lb/cu. ft. | FUNNEL FLOW SEC/1 KG |
|---|---|---|---|
| ⅛" Example 4 | .60 | 44.0 | 3.0 |
| 3/16" Commercial B | .85 | 39.2 | 3.4 |

Table 6 shows the mechanical properties of chopped strands treated with the aqueous chemical treating composition of Examples 1 and 2 and commercial sample B dry blend injection molded at 25 percent chopped glass fiber content in Celcon ® acetal copolymer resin.

The tensile flexural and izod impact tests reported in Table 6 were conducted in accordance with the test methods of the American Society of Testing and Materials (ASTM). These tests included respectively D-638, D-790, and D-256.

TABLE 6

| C.S. INDENT. | % LOI | TENSILE PROPERTIES | | | FLEXURAL PROPERTIES | | IMP. STRENGTH | |
|---|---|---|---|---|---|---|---|---|
| | | STR. PSI | % ELONG. | MOD. | STR. PSI | MOD$\times 10$ | UNI | IZOD |
| 3/16" COMMERCIAL B | | 11384 | 2.49 | .833 | 15844 | 1.053 | 5.34 (8.6) | 1.26 (8.2) |
| 3/16" Example 1 | | 15976 | 2.98 | .882 | 20706 | 1.122 | 5.92 (12.8) | 1.28 (9.2) |
| ⅛" Example 2 | | 14978 | 2.87 | .859 | 18973 | 1.059 | 5.78 (6.5) | 1.13 (5.7) |

I claim:

1. Glass fibers coated with a dried residue of an aqueous chemical treating composition consisting of:
   (a) two aqueous soluble, dispersible or emulsifiable film forming polymers selected from the group consisting of epoxy polymers and polyurethane polymers, and epoxy polyurethane copolymers and polyurethane polymers,
   (b) an amino alkyl silane coupling agent or a combination thereof with a polyamine organo functional silane coupling agent,
   (c) organo silane coupling agent selected from the group consisting of lubricant-modified amine organo functional silane coupling agent, polyamino organo functional silane coupling agent, epoxy organo functional silane coupling agent and vinyl functional organo silane coupling agent or mixture thereof,
   (d) reaction product obtained by reacting alkoxylated nitrogen-containing compound selected from the group consisting of an alkoxylated fatty amine and an alkoxylated fatty amide with a polycarboxylic acid and the resulting product reacted with an epoxide-containing compound wherein the reaction product is present in a lubricating, processability and stabilizing effective amount,
   (e) water in an amount to give an effective solids content for treating glass fibers.

2. Treated glass fibers of claim 1 wherein the epoxy polyurethane copolymer and polyurethane polymer are present as the two film forming polymers in a ratio of around 2:1 to 3:1.

3. Treated glass fibers of claim 1, wherein the amount of the epoxy polyurethane copolymer in the aqueous chemical treating composition is in the range of about 0.1 to 10 weight percent of the aqueous chemical treating composition.

4. Chemically treated glass fibers of claim 1, wherein the amount of the polyurethane polymer present in the aqueous chemical treating composition is in the range of about 0.1 to about 10 of the aqueous chemical treating composition.

5. Treated glass fibers of claim 1, wherein the amount of the amine alkyl functional silane coupling agent is in the amount of about 0.1 to about 2 weight percent of the aqueous chemical treating composition.

6. Treated glass fibers of claim 1, wherein the amount of the second silane coupling agent present in the aqueous chemical treating composition is in the range of about 0.1 to about 2 weight percent of the aqueous treating composition.

7. Treated glass fibers of claim 1, wherein there is present in the treating composition an amine alkyl functional silane coupling agent, a lubricant modified amino organo functional silane coupling agent, and a polyamine organo functional silane coupling agent where the total amount of the silane coupling agent present in the aqueous chemical treating composition is in the range of about 0.3 to about 3 weight percent of said aqueous chemical treating composition.

8. Treated glass fibers of claim 7, wherein the three silane coupling agents are present in an amount in a ratio of 1:1:1.

9. Treated glass fibers of claim 1 wherein in the aqueous chemical treating composition the reaction product process aid is present in an amount of about 0.01 to about 1 weight percent of the solids of the aqueous chemical treating composition.

10. Treated glass fibers of claim 1, wherein the reaction product process aid has an alkoxylated nitrogen containing compound selected from the group consisting of:

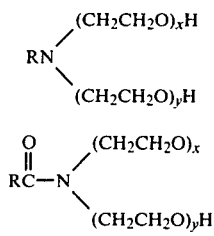

wherein R is an alkoxy group containing from 12 to 18 carbon atoms and x and y are 1 to 100 and wherein the reaction of the alkoxylated nitrogen containing compound with the polycarboxylic acid is in a mole ratio of 1 to 2 moles to produce an intermediate compound having a molecular weight of approximately 300 to 11,000 and an acid number of 20 to 300 and further reacting the intermediate compound to esterify the unesterified carboxyl groups with two moles of a polyepoxide compound.

11. Chemically treated glass fibers of claim 1 that are chopped.

12. Chopped glass fiber strands having good flow and bulk density properties for reinforcing poylmers, wherein the glass fibers, are coated with a dried residue to an aqueous chemical treating composition, consisting of:
(a) two film polymers, wherein the first film forming polymer is an aqueous soluble, dispersible or emulsifiable epoxy polyurethane copolymer, present in an amount in the range from 0.1 to about 10 weight percent of the aqueous treating composition, and wherein the second film forming polymer is an aqueous soluble, dispersible or emulsifiable polyurethane polymer, present in an amount in the range from 0.1 to about 10 weight percent of the aqueous treating composition, wherein the epoxy polyurethane copolymer is present in a predominant amount to the polyurethane polymer and wherein the total amount of the film forming polymer is present in the range of about 1 to about 20 weight percent of the aqueous treating composition,
(b) three organo silane coupling agents consisting of an amino alkyl silane couping agent, a lubricant modified amine-functional organosilane coupling agent, and as the third coupling agent, a polyamino organo functional silane coupling agent, wherein the total amount of the silane coupling agents is in the range of about 0.3 to about 3 weight percent of the aqueous chemical treating composition,
(c) reaction product obtained by reacting alkoxylated nitrogen-containing compound selected from the group consisting of an alkoxylated fatty amine and an alkoxylated fatty amide with a polycarboxylic acid and the resulting product being reacted with an epoxide-containing compound, wherein the reaction product is present in an amount in the range of about 0.01 to about 1 weight percent of the solids of the aqueous chemical treating composition for effective lubrication, processability and stabilization, and
(d) water in an amount to give an effective solids content for treating glass fibers.

13. Treated glass fiber of claim 11, wherein the three silane coupling agents are present in a ratio of 1:1:1.

14. Treated glass fiber strands of claim 12, wherein the epoxy polyurethane copolymer has an epoxide equivalent weight of 540 and is present as an aqueous emulsion having 60 percent total solids diluted around 1:1 to 1:5 with water.

15. Glass fiber strands of claim 12, wherein the epoxy polyurethane copolymer is present in an amount of about 0.2 to about 3.5 weight percent of the aqueous chemical treating composition.

16. Glass strands of claim 12, wherein a 62 weight percent solids aqueous polyurethane emulsion diluted for use in an aqueous chemical treating composition is present in the aqueous chemical treating composition in an amount of about 1 to 3 weight percent of the aqueous chemical treating composition.

17. Treated glass fiber strands of claim 12, wherein the reaction product process aid has an alkoxylated nitrogen containing compound selected from the group consisting of:

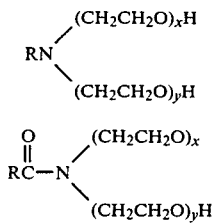

wherein R is an alkyl group containing from 12 to 18 carbon atoms and x and y are 1 to 100 and wherein the reaction of the alkoxylated nitrogen containing compound with the polycarboxylic acid is in a mole ratio of 1 to 2 moles to produce an intermediate compound having a molecular weight of approximately 300 to 11,000 and an acid number of 20 to 300 and further reacting the intermediate compound to esterify the unesterified carboxyl groups with two moles of a polyepoxide compound.

18. Treated glass fiber strands of claim 12 having a total solids content in the range of about 3 to about 11 weight percent.

19. Chemically treated glass fiber strands of claim 12 having an LOI of around 0.1 to about 1.5 percent.

20. Glass fiber strands of claim 12 wherein the dried residue resulted from drying to impart to the chopped glass fiber strands a bulk density in pounds per cubic feet ranging from about 37 to at least 39 and a funnel flow in seconds per one kilogram at least as low a 2 to 6 seconds.

21. Glass fibers of claim 1, wherein the amino alkyl silane coupling agent is hydrolyzed.

* * * * *

UNITED STATES PATENT AND TRADEMARK OFFICE
CERTIFICATE OF CORRECTION

PATENT NO. : 4,615,946

DATED : October 7, 1986

INVENTOR(S) : Chester S. Temple

It is certified that error appears in the above-identified patent and that said Letters Patent is hereby corrected as shown below:

Claim 10, column 13, line 14, "alkoxy" should read --alkyl--.

Claim 12, column 13, line 29, "to" should read --of--; column 13, line 28, the comma after "fibers" should be deleted; column 13, line 31, --forming--should be inserted between "film" and "polymers"; column 13, line 48, "couping" should be --coupling--.

Claim 13, column 14, line 6, --strands-- should be after "fiber".

Claim 16, column 14, line 17, --fiber-- should be inserted after "Glass".

Claim 20, column 14, line 58, "as low a" should be "as low as".

Signed and Sealed this

Eleventh Day of August, 1987

Attest:

DONALD J. QUIGG

*Attesting Officer*          *Commissioner of Patents and Trademarks*